(12) United States Patent
Campomanes et al.

(10) Patent No.: US 10,822,988 B2
(45) Date of Patent: Nov. 3, 2020

(54) METHOD OF SIZING A CAVITY IN A PART

(71) Applicant: Pratt & Whitney Canada Corp., Longueuil (CA)

(72) Inventors: Marc Lorenzo Campomanes, Longueuil (CA); Orlando Scalzo, Boucherville (CA); Mathieu Fagnan, Lasalle (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 871 days.

(21) Appl. No.: 14/976,416

(22) Filed: Dec. 21, 2015

(65) Prior Publication Data

US 2017/0175561 A1 Jun. 22, 2017

(51) Int. Cl.
*F01D 11/00* (2006.01)
*F01D 11/12* (2006.01)
(Continued)

(52) U.S. Cl.
CPC ............ *F01D 11/127* (2013.01); *B23P 9/025* (2013.01); *B24B 39/00* (2013.01); *B24B 39/02* (2013.01); *F01D 5/12* (2013.01); *F01D 9/04* (2013.01); *F01D 11/005* (2013.01); *F16B 17/006* (2013.01); *F16B 21/20* (2013.01); *F16J 15/061* (2013.01); *F16J 15/0881* (2013.01); *B22F 3/1055* (2013.01); *B22F 3/16* (2013.01); *B22F 3/225* (2013.01); *B22F 2003/166* (2013.01); *B22F 2005/005* (2013.01); *F05D 2220/32* (2013.01); *F05D 2230/20* (2013.01); *F05D 2230/25* (2013.01); *F05D 2230/60* (2013.01); *F05D 2240/11* (2013.01); *F05D 2260/37* (2013.01)

(58) Field of Classification Search
CPC ....... F01D 11/08; F01D 11/127; F01D 11/005
See application file for complete search history.

(56) References Cited

U.S. PATENT DOCUMENTS 3,801,220 A * 4/1974 Beckershoff .............. F01D 5/06
415/134
5,975,844 A * 11/1999 Milazar ................. F01D 11/005
277/643
(Continued)

FOREIGN PATENT DOCUMENTS

| EP | 1162346 | 12/2001 |
|---|---|---|
| EP | 1286021 | 2/2003 |
| EP | 1832716 | 9/2007 |

*Primary Examiner* — Justin D Seabe
(74) *Attorney, Agent, or Firm* — Norton Rose Fulbright Canada LLP

(57) ABSTRACT

A method of sizing a cavity in a part and a part made from such method. The method includes forming the part having the cavity, including forming a plurality of protrusions extending within the cavity from at least one internal surface of the cavity, the protrusions having distal ends bordering an unobstructed portion of the cavity, the unobstructed portion having an initial dimension at least partially defined by a position of the distal ends, pressing a deforming element against the distal ends of the protrusions to plastically deform the protrusions toward the at least one internal surface of the cavity and increase the initial dimension to a final dimension, and disengaging the deforming element from the distal ends.

6 Claims, 8 Drawing Sheets

(51) Int. Cl.

| | |
|---|---|
| *F01D 5/12* | (2006.01) |
| *F01D 9/04* | (2006.01) |
| *B24B 39/00* | (2006.01) |
| *B23P 9/02* | (2006.01) |
| *F16J 15/06* | (2006.01) |
| *F16B 17/00* | (2006.01) |
| *B24B 39/02* | (2006.01) |
| *F16B 21/20* | (2006.01) |
| *F16J 15/08* | (2006.01) |
| *B22F 3/16* | (2006.01) |
| *B22F 5/00* | (2006.01) |
| *B22F 3/105* | (2006.01) |
| *B22F 3/22* | (2006.01) |

(56) References Cited

U.S. PATENT DOCUMENTS

| | | | | |
|---|---|---|---|---|
| 7,175,387 | B2* | 2/2007 | Kreis | F01D 5/22 |
| | | | | 277/628 |
| 7,201,559 | B2* | 4/2007 | Gendraud | F01D 11/005 |
| | | | | 277/641 |
| 7,562,880 | B2* | 7/2009 | Paprotna | F16J 15/322 |
| | | | | 277/644 |
| 10,006,355 | B2* | 6/2018 | Hayashi | F02B 37/24 |
| 2012/0153549 | A1 | 6/2012 | Milagres Ferri et al. | |
| 2013/0239368 | A1 | 9/2013 | Watson | |

\* cited by examiner

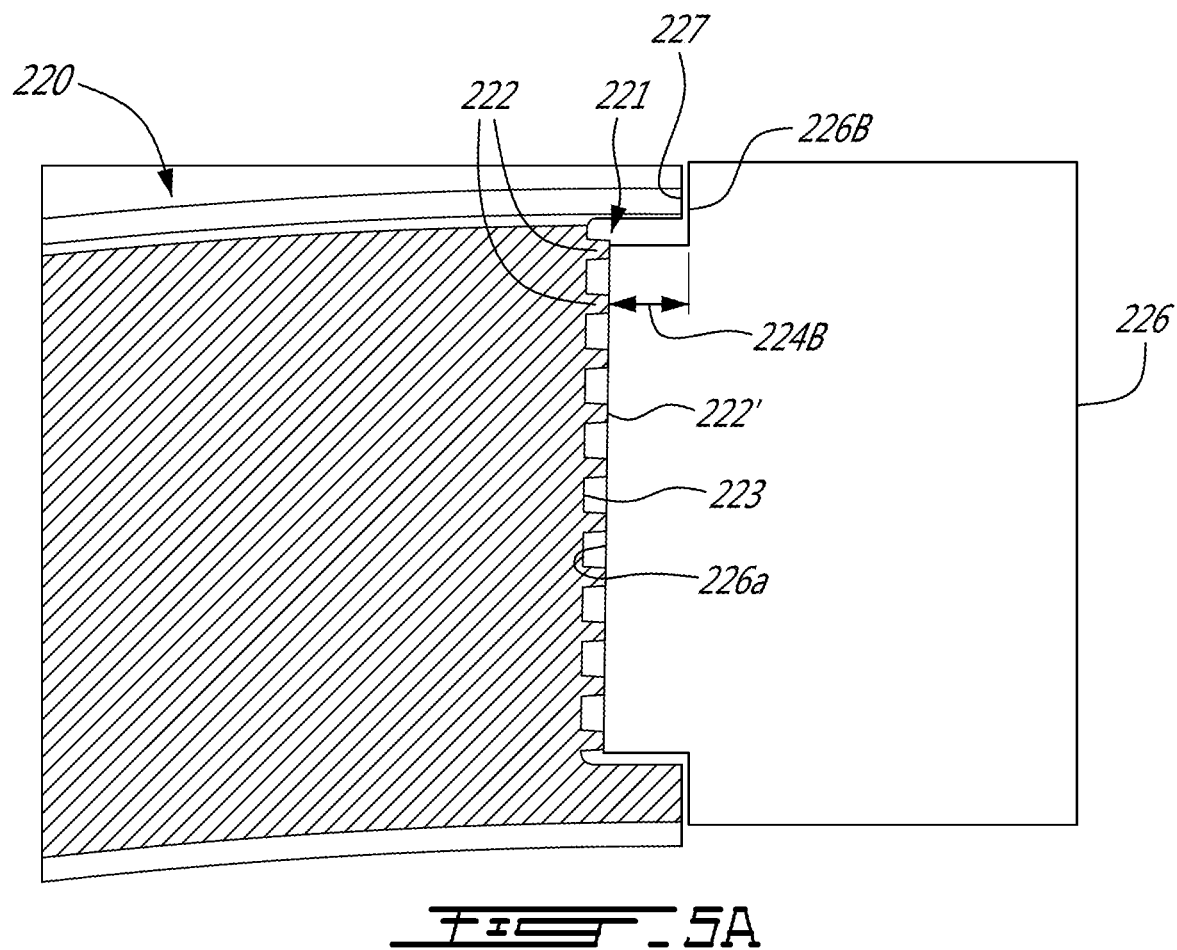

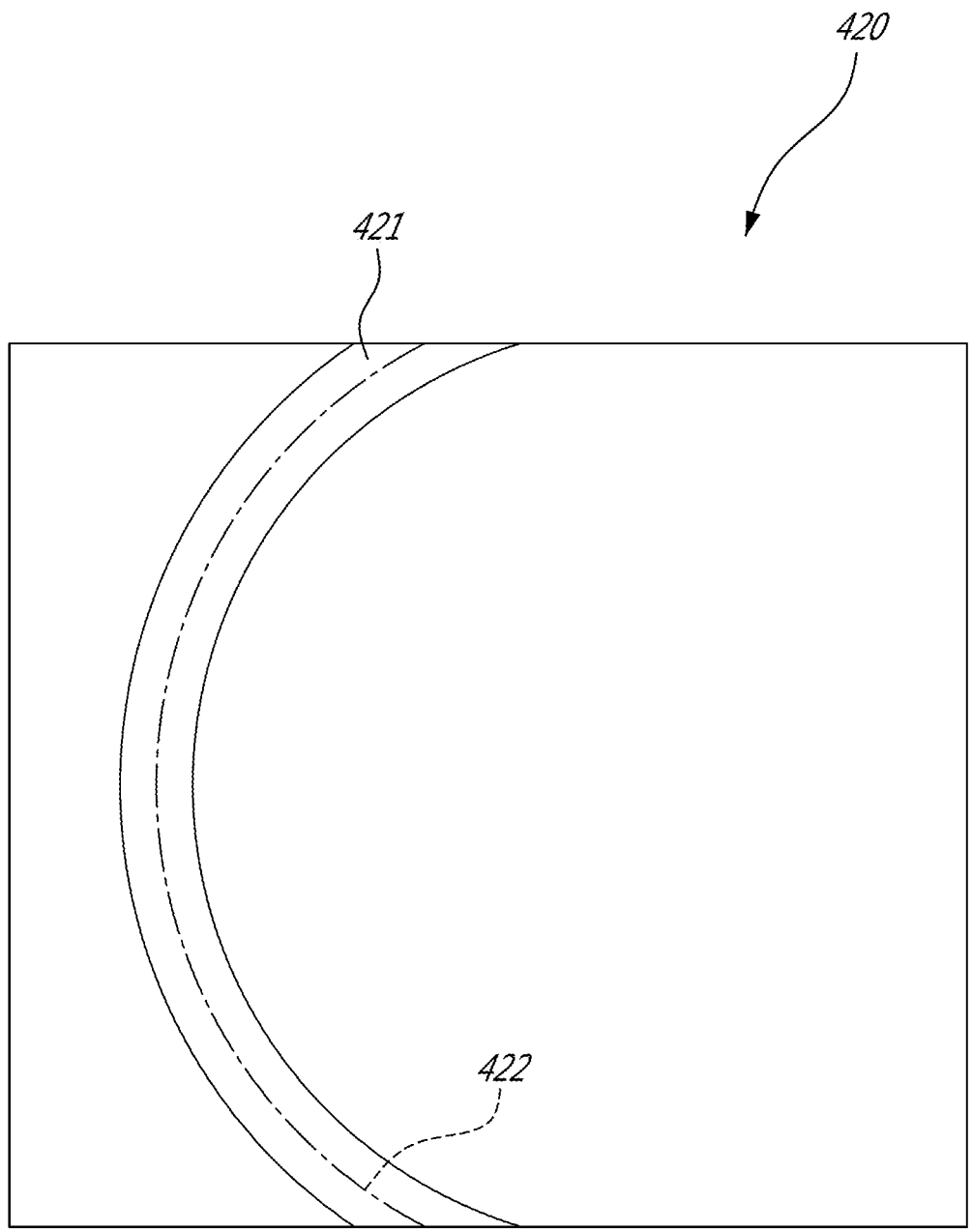

METHOD OF SIZING A CAVITY IN A PART

TECHNICAL FIELD

The application relates generally to parts having cavities defined therein and, more particularly, to sizing such cavities.

BACKGROUND

Tight tolerance precision cavities or openings in parts can be produced using various techniques. For example, the openings in metal parts can be machined, which requires very precise drilling, boring, reaming, or grinding. In addition, if multiple openings are required at different angles, the machining equipment and processes increase in complexity. Furthermore, it may be difficult or in some cases impossible to machine curved openings.

Additive manufacturing, powder injection molding, or casting may be used to make complex geometry parts with openings that are difficult to realize by other methods. However, such processes may leave the openings with a rough surface finish and/or relatively large dimensional tolerance. Therefore, secondary finishing (e.g. machining) is often required to form a precision fit for the opening in metal parts formed by such methods.

SUMMARY

In one aspect, there is provided a method of sizing a cavity in a part, comprising: forming the part having the cavity, including forming a plurality of protrusions extending within the cavity from at least one internal surface of the cavity, the protrusions having distal ends bordering an unobstructed portion of the cavity, the unobstructed portion having an initial dimension at least partially defined by a position of the distal ends; pressing a deforming element against the distal ends of the protrusions to plastically deform the protrusions toward the at least one internal surface of the cavity and increase the initial dimension to a final dimension; and disengaging the deforming element from the distal ends.

In another aspect, there is provided a method of sizing a cavity of a part, comprising: forming the part having the cavity, including forming a plurality of protrusions extending within the cavity from at least one internal surface of the cavity, the protrusions having distal ends bordering an unobstructed portion of the cavity, the unobstructed portion having an initial dimension at least partially defined by a position of the distal ends; pressing against the distal ends of the protrusions to plastically deform the protrusions toward the at least one internal surface of the cavity and increase the initial dimension to a final dimension; and inserting the element in the unobstructed portion of the cavity, the element having an element dimension defined along the final dimension, the element dimension being larger than the initial dimension and smaller than the final dimension, the element being removably received in the cavity.

In yet another aspect, there is provided a shroud segment assembly for a gas turbine engine, comprising: a shroud segment having a seal cavity defined therein, the shroud segment including a plurality of deformable protrusions extending within the cavity from at least one internal surface of the cavity, the deformable protrusions having distal ends bordering an unobstructed portion of the cavity, the unobstructed portion having an initial dimension at least partially defined by a position of the distal ends, the deformable protrusions being plastically deformable toward the at least one surface to increase the initial dimension to a final dimension; and a seal removably receivable within the seal cavity after deformation of the protrusions, the seal having a dimension defined along a direction corresponding to the initial and final dimensions, the dimension of the seal being larger than the initial dimension and smaller than the final dimension.

DESCRIPTION OF THE DRAWINGS

Reference is now made to the accompanying figures in which:

FIG. 5A is a schematic side view of the end of the shroud segment of FIG. 4B before being engaged by a die;

FIG. 7 is a schematic view of a part according to another particular embodiment, the part having a curved cavity therein.

DETAILED DESCRIPTION

Figure 1:
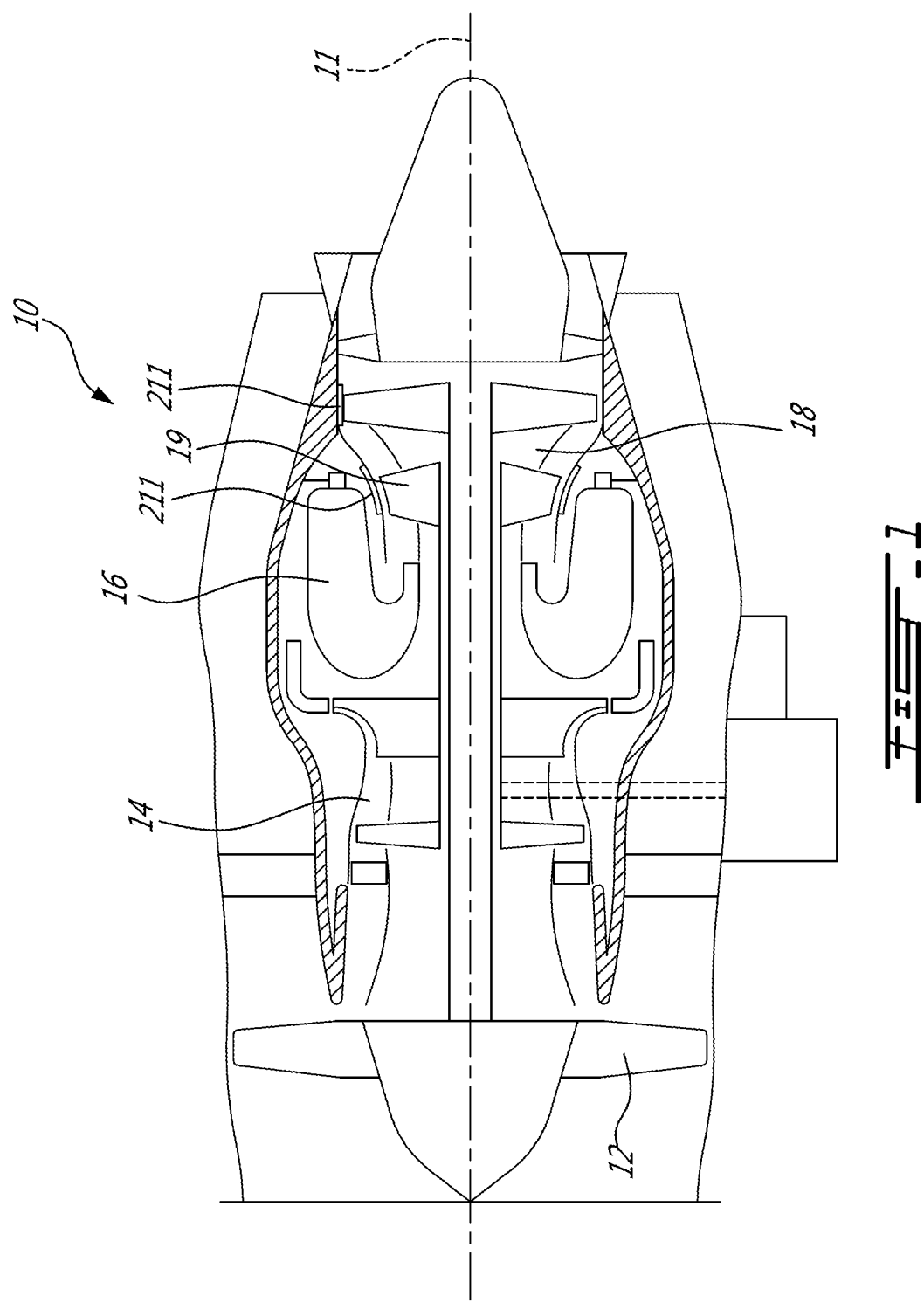
FIG. 1 is a schematic cross-sectional view of a gas turbine engine.

FIG. 1 illustrates a gas turbine engine 10 of a type preferably provided for use in subsonic flight, generally comprising in serial flow communication a fan 12 through which ambient air is propelled, a compressor section 14 for pressurizing the air, a combustor 16 in which the compressed air is mixed with fuel and ignited for generating an annular stream of hot combustion gases, and a turbine section 18 for extracting energy from the combustion gases. Although the gas turbine engine 10 is shown here as a turbofan, it is understood that the gas turbine engine 10 may have any other appropriate type of configuration, and may be for example a turboprop or turboshaft engine.

The turbine section 18 generally comprises one or more stages of rotor blades 19 extending radially outwardly from respective rotor disks, with the blade tips being disposed closely adjacent to a stationary annular turbine shroud 211 supported from the engine casing. The turbine shroud 211 defines a portion of the radially outer boundary of the engine gas path.

Some components or parts of the gas turbine engine 10 have cavities therein. These cavities can be used for various purposes, such as conveying fluid from one area of the gas turbine engine 10 to another, changing the flow characteristics of the fluid being conveyed, or receiving connectors to seal or join adjacent parts of the gas turbine engine 10. A number of manufacturing methods allow the part to be shaped directly with such cavities therein, for example powder metallurgy and/or molding methods, which include powder injection molding such as metal injection molding, casting, and additive manufacturing.

In manufacturing methods involving a molding process, such as for example casting and powder injection molding, each cavity of the part is typically formed by a moveable mold element (e.g. mold pin) extending within the mold cavity, received where the cavity of the part (e.g. hole) is defined, and disengaged from the cavity formed in the part thereby as the part is removed from the mold cavity. The mold portions receiving and engaging the moveable mold elements also include cavities to receive these mold elements as they are being retracted from engagement with the part; such mold portions may thus also be parts formed by powder metallurgy and/or molding methods.

The cavities defined in a part, whether this part is an engine part or a mold portion used to form an engine part, may require relatively tight tolerances with respect to their dimensions, which may not always be directly achievable by methods allowing to shape a part with openings directly defined therein such as powder injection molding (e.g. metal injection molding), casting, and additive manufacturing. The present description sets forth a method which in a particular embodiment allows to size a cavity with tighter tolerances than those achieved by methods allowing to shape a part with openings directly defined therein such as powder injection molding (e.g. metal injection molding), casting, and/or additive manufacturing, thus allowing these methods to be used even for parts requiring tight tolerances in cavity dimensions.

In a particular embodiment, the parts described herein are thus formed using a powder metallurgy production technique such as metal injection molding (MIM), or additive manufacturing. Metal injection molding (MIM) is a near-net injection process that allows very small details to be molded into the part. In this technique, very fine metal powder is mixed with a polymer binder, and injection molded to form a "green" part. The part is then treated to remove the binder and provide a "brown" part, and the brown part is sintered to obtain the final part. Additive manufacturing, commonly referred to as "3D printing", employs metal powders to make the part by depositing the metal powder in layers and then fusing it. Suitable additive manufacturing methods include, but are not limited to, powder bed fusion laser, electron beam melting (EBM), selective laser melting, and direct metal laser sintering (DMLS). The part can also be formed by other molding methods, such as for example casting.

In a particular embodiment, the parts described herein are made of metal. It is however understood that the methods discussed herein may also be applicable to parts made of other deformable materials, including but not limited to suitable polymers.

Figure 2A:
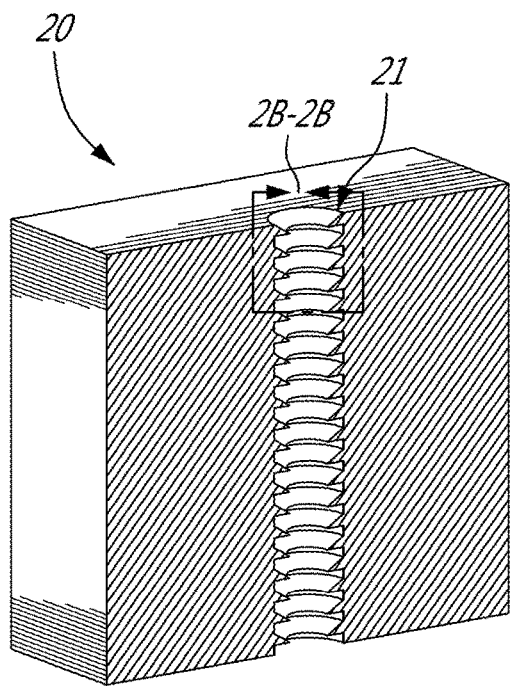
FIG. 2A is a schematic cross-sectional tridimensional view of a mold portion according to a particular embodiment, which may be used as part of a mold to make a part of a gas turbine engine such as shown in FIG. 1.
Figure 2B:
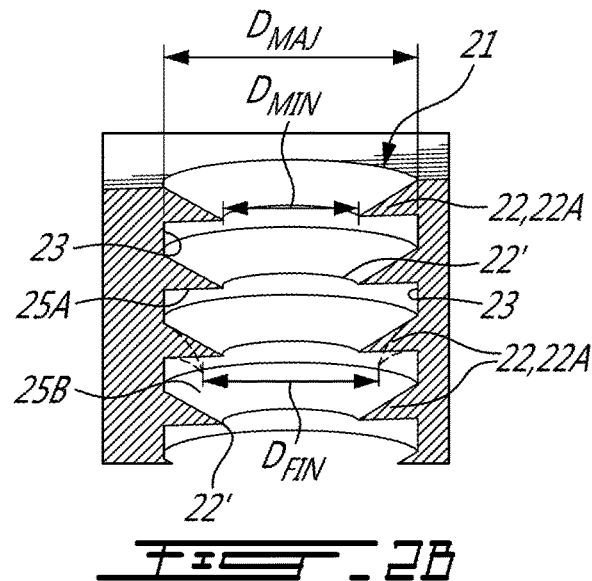
FIG. 2B is an enlarged schematic view of the outlined portion of FIG. 2A.

FIGS. 2A and 2B show a part 20 according to a particular embodiment, where the part 20 is part of a mold used to make a component of the gas turbine engine 10, such as for example a shroud segment, or a fuel nozzle. The part 20 includes a cavity 21 defined through the part 20 (e.g. cylindrical through hole), and forming a guide passage for a guide pin 21' (see FIG. 3A). In use, the guide pin 21' is extended in the mold cavity to form a corresponding opening in the molded part, and retracted from the mold cavity to disengage the molded part from the mold cavity. The guide pin 21' is extended into and retracted from the mold cavity through a sliding motion within the cavity 21 of the mold portion 20.

The cavity 21 of the part 20 has a plurality of deformable protrusions 22 which project into the cavity 21 from an internal surface 23 of the cavity 21, which in the embodiment shown is a circumferential surface. Each protrusion 22 thus extends radially and has a distal end 22' which is spaced a distance from the surface 23 of the cavity 21. The distal ends 22' border an unobstructed portion of the cavity 21, i.e. a portion of the cavity free to receive an object therein without the protrusions 22 causing interference with the object. In the embodiment shown, the unobstructed portion corresponds to the cylindrical space at the center of and bordered by the distal ends 22'. The protrusions 22 are plastically deformable toward the surface 23 of the cavity 21, as will be further detailed below.

Still referring to FIG. 2B, the protrusions 22 extend into the cavity 21 and the positions of the distal ends 22' collectively define an initial dimension $D_{MIN}$ of the unobstructed portion of the cavity 21. The initial dimension $D_{MIN}$ of the cavity 21 refers to the size of the unobstructed portion of the cavity 21 before the protrusions 22 are deformed. In the embodiment shown, the initial dimension $D_{MIN}$ is a diameter of the unobstructed portion of the cavity 21, as measured between opposing ones of the distal ends 22'.

Alternately, when the protrusions 22 do not extend around the entire circumference of the internal surface 23, the unobstructed portion of the cavity 21 is bordered by the internal surface 23 in its circumferential portions(s) free of protrusions, and the initial dimension $D_{MIN}$ of the cavity 21 is defined between the surface 23 of the cavity 21 and the distal ends 22' of the protrusions 22.

Once the protrusions 22 are deformed toward the surface 23 of the cavity 21, as illustrated in dotted lines, the distal ends 22' are closer to the surface 23 of the cavity 21 than they were prior to being deformed. In this deformed state, the distal ends 22' collectively define a final dimension $D_{FIN}$ or diameter of the unobstructed portion of the cavity 21. The deformation of the protrusions 22 thus increases the initial dimension $D_{MIN}$ to the final dimension $D_{FIN}$.

Figure 3A:
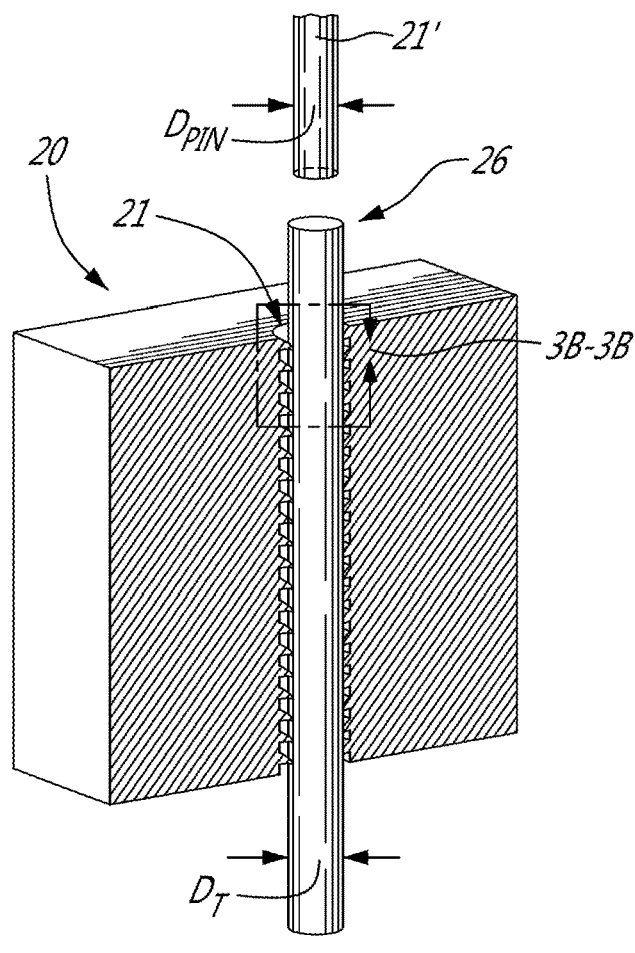
FIG. 3A is a schematic cross-sectional tridimensional view of a deforming tool inserted in a cavity of the part of FIG. 2A.
Figure 3B:
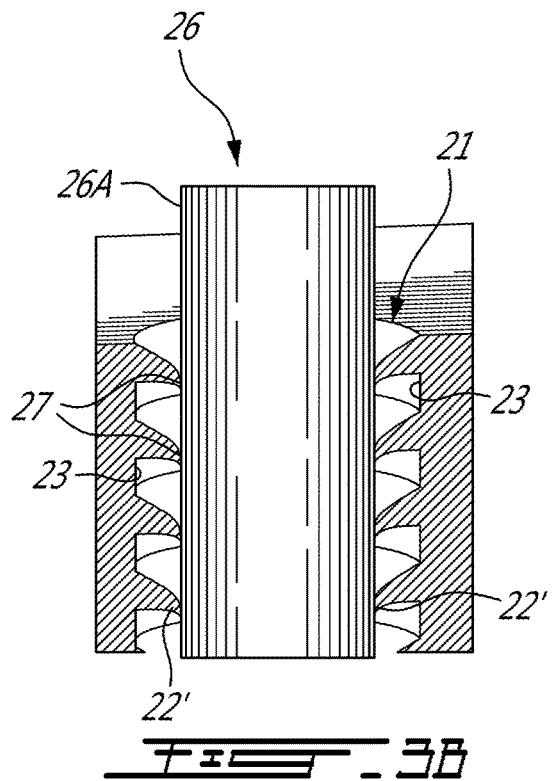
FIG. 3B is an enlarged schematic view of the outlined portion of FIG. 3A.
Figure 3C:
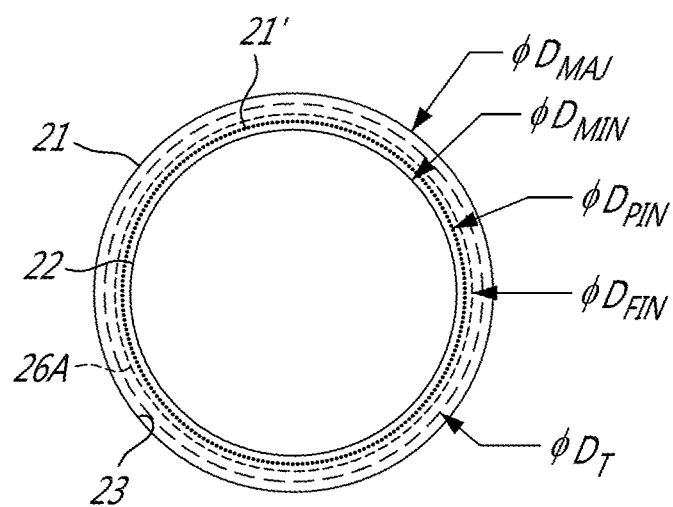
FIG. 3C is a schematic cross-sectional view of the cavity of the part of FIG. 2A after having received therein the deforming tool.

Referring to FIG. 2B and FIG. 3C, it will thus be appreciated that the final dimension $D_{FIN}$ of the unobstructed portion of the cavity 21 (i.e. after deformation) is smaller than the maximum dimension $D_{MAJ}$ of the cavity 21 itself as defined by the diameter of the internal surface 23, but larger than the initial dimension $D_{MIN}$ of the unobstructed portion of the cavity 21 (i.e. prior to deformation). Since the deformation process is more predictable than the method used to create the part 20, the final dimension $D_{FIN}$ of the unobstructed portion of the cavity 21 can have tighter tolerances than the corresponding maximal dimension $D_{MAJ}$ of the cavity 21 itself.

The protrusions 22 extending from the surface 23 of the cavity 21 can take any suitable shape, and be of any suitable size, in order to achieved the functionality described above. There can similarly be any number of protrusions 22 extending from the surface 23. In the embodiment of FIGS. 2A and 2B, each protrusion 22 is an annular disc 22A extending into the cavity 21 from the internal surface 23. Each annular disc 22A has a first surface 25A and an opposed second surface 25B. The first surface 25A extends into the cavity 21 at an angle being substantially normal to the surface 23 of the cavity 21. The second surface 25B forms an obtuse angle with the surface 23. This configuration of the annular discs 22A may reduce the effort required to plastically deform the discs 22A toward the surface 23.

Figure 2C:
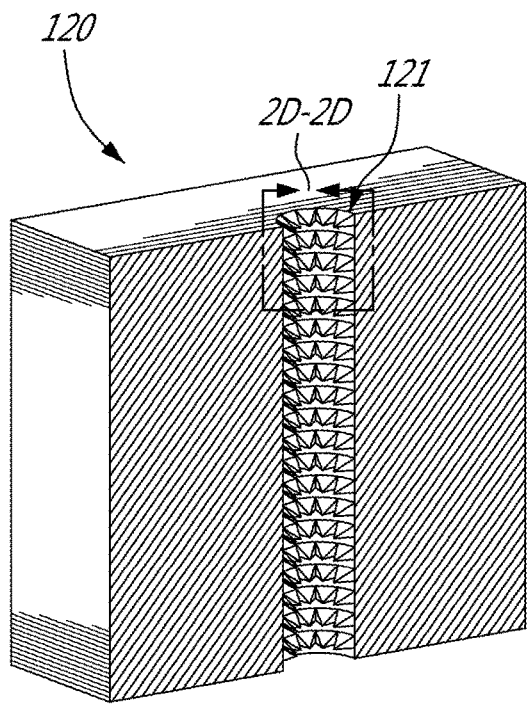
FIG. 2C is a schematic cross-sectional tridimensional view of a mold portion according to another particular embodiment, which may be used as part of a mold to make a part of a gas turbine engine such as shown in FIG. 1.
Figure 2D:
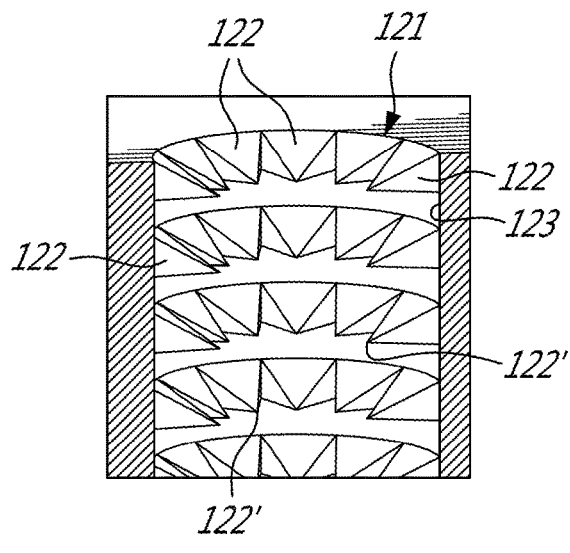
FIG. 2D is an enlarged schematic schematic view of the outlined portion of FIG. 2C.

FIGS. 2C and 2D shows a mold part 120 including a cavity 121 in accordance with another embodiment, where each protrusion 122 is in the form of a tooth. The teeth 122 are arranged in rows which are axially spaced apart along the length of the cavity 121, and each tooth 122 is circumferentially spaced apart from an adjacent tooth 122 of the same row; the tooth 122 may be regularly spaced apart around the internal circumferential surface 123. Each tooth 122 extends into the cavity 221 from the internal surface 123 and terminates at its distal end 122', thereby forming a prism. It is understood that the protrusion shapes shown are exemplary only and that any other suitable for the protrusions is within the scope of the present disclosure.

Referring to FIGS. 3A-3B, in order to achieve the desired, final dimension $D_{FIN}$ of the unobstructed portion of the cavity 21, in a particular embodiment, once the part 20, the cavity 21, and the protrusions 22 are formed, a deforming element or tool 26 having a corresponding outer dimension $D_T$ or outer diameter larger than the initial dimension $D_{MIN}$, but smaller than the maximum dimension $D_{MAJ}$ of the cavity 21, is inserted into the unobstructed portion of the cavity 21. Since the tool 26 is larger than the unobstructed portion of the cavity 21, there is interference between the protrusions 22 and the outer surface 26A of the tool 26, which presses against the distal ends 22' as it moves along the axial, depth-wise direction of the cavity 21. The outer surface 26A of the tool 26 thus engages the protrusions 22 and compresses them, or some part thereof, toward the surface 23 of the cavity 21 to plastically deform the protrusions 22. In the embodiment shown, the deforming element or tool is a cylindrical tool 26 and thus the outer surface 26A of the tool 26 engaging the distal ends 22' is an annular, circumferential surface.

Although the protrusions 22 are plastically deformed by the insertion of the tool 26 into the cavity 21, it may occur that some portion of each protrusion 22 undergoes elastic deformation. This portion may undergo a relatively small elastic rebound into the cavity 21 when the tool 26 is removed therefrom to define the final diameter $D_{FIN}$ of the cavity 21. When this occurs, the outer tool diameter $D_T$ is greater than the final diameter $D_{FIN}$ of the cavity 21, as defined by the rebounded deformed protrusions 22. Once the protrusions 22 are deformed, the tool 26 is disengaged from the distal ends 22' by removing it from the cavity 21.

The insertion of the tool 26 into the cavity 21 may define a circumferential sliding surface 27 with the deformed protrusions 22. More particularly, the collectively deformed distal ends 22' of the protrusions 22 create the sliding surface 27 to receive therein a component, such as a pin 21', which allows for a functional slide fit with the cavity 21. The inserted pin 21' may naturally center itself within the cavity 21 to equalize the radial forces created by the sliding surface 27. This natural centering helps to precisely position the pin 21' at the center of the deformed protrusions 22. In a particular embodiment, the pin 21' may be guided in its sliding motion through the cavity 21 to further increase the precision.

When the cavity is intended to receive a part with a sliding fit, such as the mold pin 21' of the embodiment shown, the tool 26 is "oversized" with respect to the pin 21' to be received in the cavity 21, i.e. the outer tool diameter $D_T$ is greater than the pin diameter $D_{PIN}$ by a sufficient margin to ensure a slide fit (for example, 0.001 inch larger).

Referring particularly to FIG. 3C, in a particular embodiment and as a non-limiting example, the cavity 21 has a major diameter $D_{MAJ}$ of 0.280 inch, while each protrusion 22 projects inwardly into the cavity 21 a distance of 0.025 inch. The protrusions 22 therefore define a minor diameter $D_{MIN}$ for the unobstructed portion of the cavity 21 of 0.230 inch. The outer surface 26A of the deforming tool 26 has a tool diameter $D_T$ of 0.253 inch. The tool diameter $D_T$ is greater than the minor diameter $D_{MIN}$, which allows the tool 26 to deform the protrusions 22 when it is inserted into the cavity 21. Some elastic spring back cause the protrusions 22 to give a final diameter $D_{FIN}$ of 0.251 inch. The unobstructed portion of cavity 21 is now precisely sized to receive therein with a slide fit a pin 21' having a pin diameter $D_{PIN}$ of 0.250 inches. More particularly, the pin 21' is able to slide in the cavity 21 while being positioned therein with a tight tolerance, since the difference between the diameter $D_{PIN}$ of the pin 21' and the diameter $D_{FIN}$ of the space receiving the pin is about 0.001 inch. It is understood that the dimensions provided are for illustrative purposes only, and that other dimensions may be used and are within the scope of the present disclosure.

Although FIGS. 3A-3C show the part 20 of FIGS. 2A-2B, it is understood that a similar method is applied to the part 120 of FIGS. 2C-2D and to any other similar part.

Although the part 20, 120 are described as mold portions used to form a component of the gas turbine engine, it will be appreciated that the parts 20, 120 can also be components of the gas turbine engine. Also or alternately, the cavity 21, 121 can be any high precision (i.e. tight tolerance) hollow space that extends through some or all of the part 20, 120. Examples of other forms the cavity 21, 121 can take include a cavity with a non-circular cross-section (e.g. with one or more planar surfaces), such as rectangular and dovetail shaped cross-sections, a helicoidal cavity, or any other appropriate complex geometry.

Figure 4A:
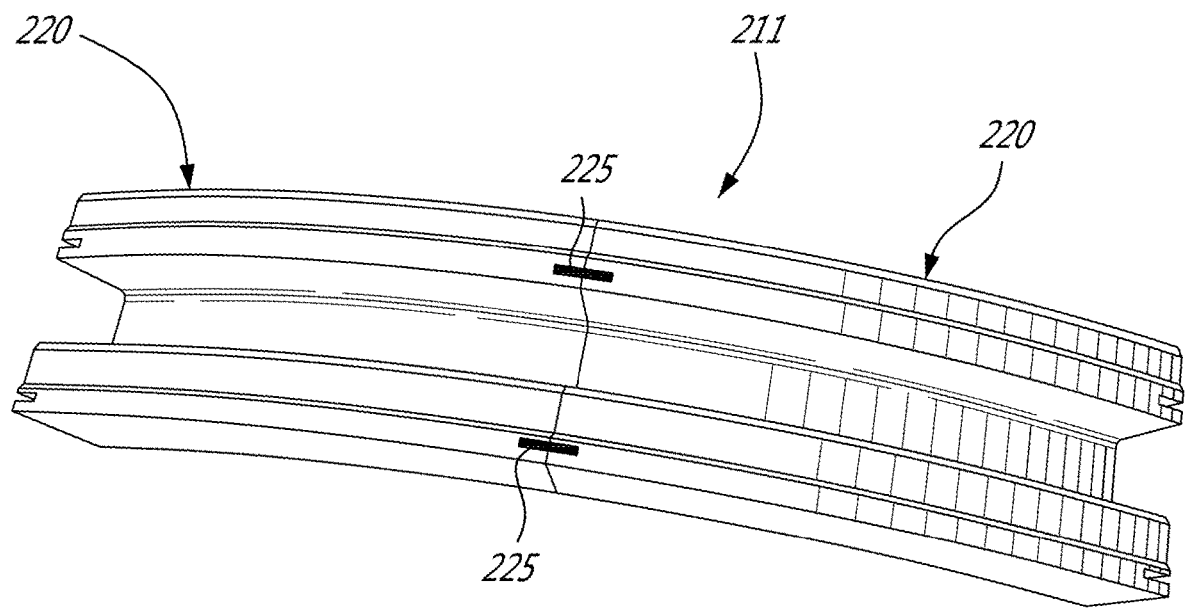
FIG. 4A is a schematic tridimensional view of shroud segments of the gas turbine engine of FIG. 1, according to another particular embodiment.
Figure 4B:
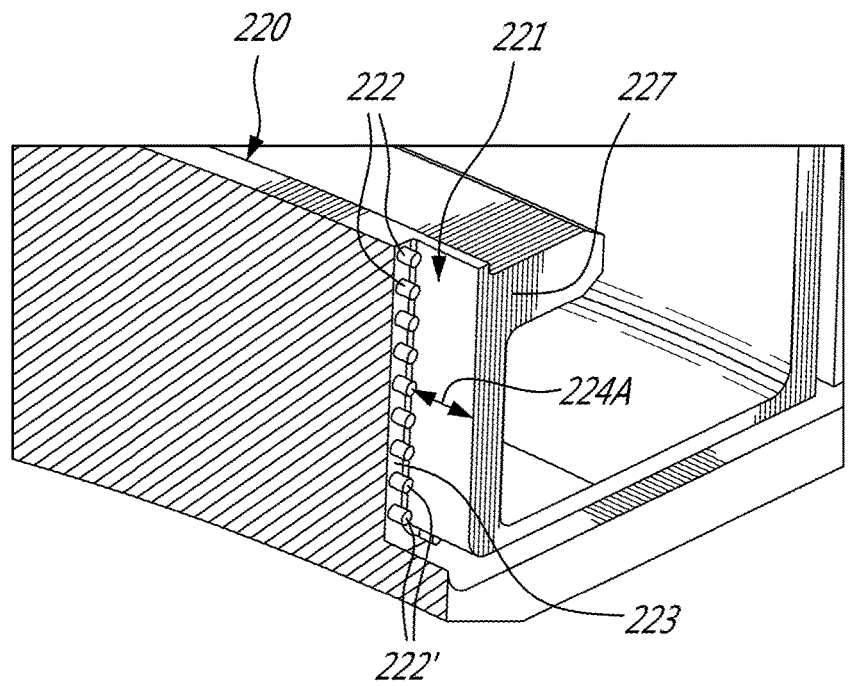
FIG. 4B is a schematic tridimensional view of an end of one of the shroud segments of FIG. 4A.

FIGS. 4A and 4B show an alternate embodiment where the part 220 is an engine component, shown here as a shroud segment. In a particular embodiment, the turbine shroud 211 of the gas turbine engine is segmented in the circumferential direction and accordingly includes a plurality of similar or identical circumferentially adjoining shroud segments 220, which together define the annular turbine shroud 211. In a particular embodiment, each shroud segment 220 is individually supported and located within the engine by an outer housing support structure.

The shroud segments 220 provide a tight seal around the rotor blades. The air leakage between the segments 220 is minimized by inserting seals 225 (FIG. 4A) into seal cavities 221 (FIG. 4B) at circumferential ends of the shroud segments 220. These cavities 221 or slots require high precision to be able to accommodate dimensional variations occurring during engine operation. When the shroud segment 220 is manufactured by powder metallurgy and/or molding methods (e.g. powder injection molding, additive manufacturing, casting), the tolerances of the manufacturing method may not be sufficient to achieve a necessary tolerance for the size of the cavity 221. The protrusions 222 disclosed herein help to address this issue by allowing a forming operation to define the precision depth of the cavities 221 within the shroud segment 220.

Referring particularly to FIG. 4B, the cavity 221 in this embodiment is a slot extending into the shroud segment 220 from an outer end surface 227 thereof. The slot 221 has an internal, planar bottom surface 223, and the protrusions 222 extend within the slot 221 from the internal surface 223 toward the outer end surface 227. The initial dimension of the unobstructed portion of the slot 221 that is defined in part by the distal ends 222' of the protrusions 222, as measured between the distal ends 222' and the outer end surface 227, is an initial depth 224A. When the protrusions 222 are deformed towards the internal surface 223 of the slot 221, the final dimension defined by the distal ends 222' of the deformed protrusions 222 is a final depth 224B (see FIG. 5B) of the unobstructed portion of the slot 221, as also measured between the distal ends 222' and the outer end surface 227. Since the slot 221 is enlarged by the deformation of its protrusions 222, the final depth 224B is greater than the initial depth 224A.

Figure 5B:
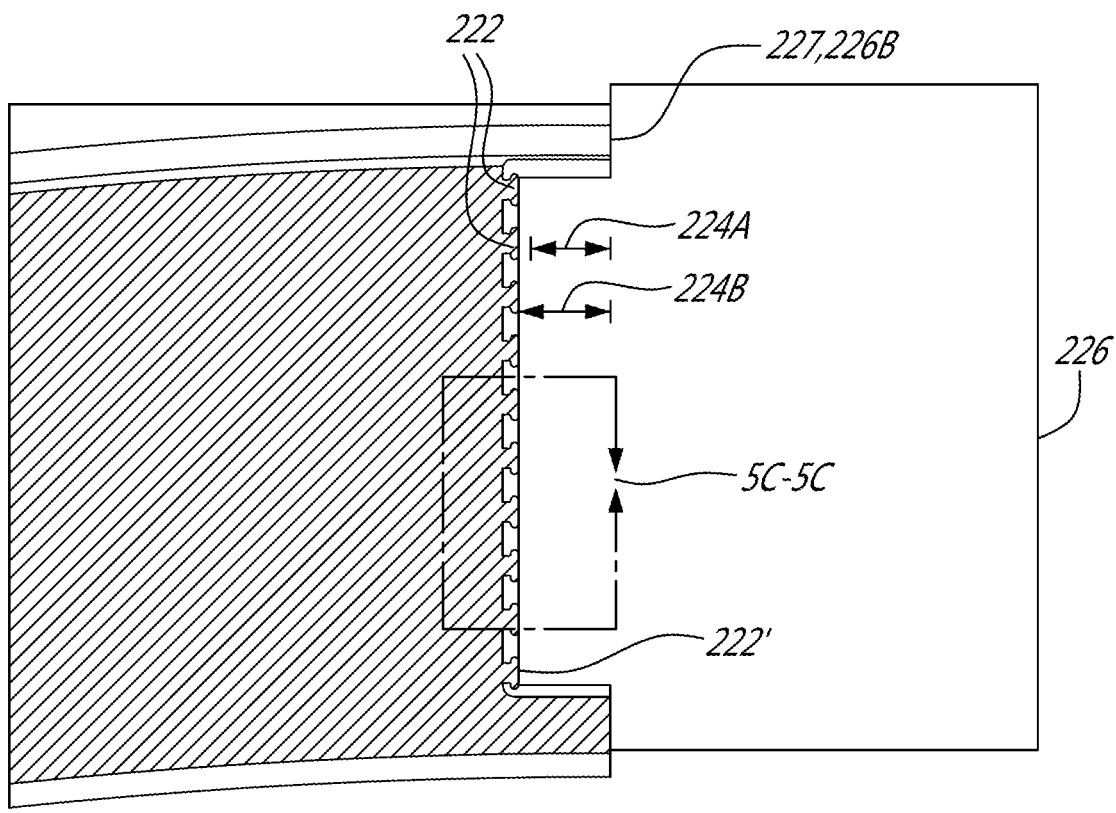
FIG. 5B is a schematic side view of the end of the shroud segment of FIG. 4B after being engaged by the die.
Figure 5C:
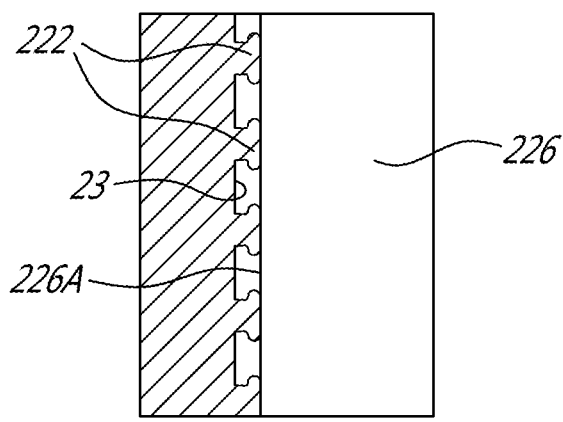
FIG. 5C is an enlarged schematic view of the outlined portion of FIG. 5B.

Referring to FIGS. 5A to 5C, which show side views of the slot 221 of FIG. 4B, the deforming tool in this embodiment is a coining die 226. The die 226 has an outer surface 226A that is planar and which deforms the protrusions 222 by coining them. The die 226 also includes at least one shoulder 226B, and in the embodiment shown two shoulders 226B, abutting the outer end surface 227 upon maximum deformation of the protrusions 222; the offset or distance between the shoulders 226B and the outer surface 226A engaging the protrusions 222 defines the final depth 224B of the unobstructed portion of the slot 221. The die 226 applies pressure to the protrusions 222 and causes their plastic deformation. In a particular embodiment, the deformation is done at room temperature and corresponds to cold forging. The deformed height of the protrusions 222 increases the depth of the unobstructed portion of the slot 221, or effective depth of the slot 221, to the final depth 224B.

Once the final depth 224B is obtained, the die 226 is disengaged from the distal ends 222' by removing it from the slot 221. The seal 225 can then be received in the slot 221.

Although the part 220 is shown as a shroud segment, it is understood that a similar method can be applied to other components of the gas turbine engine and/or other cavities of a shroud segment. Some non-limitative examples of the part include a shroud segment where the cavity is a cooling hole extending through the shroud segment, and a fuel nozzle stem where the cavities are complex-geometry fuel passages.

Figure 6A:
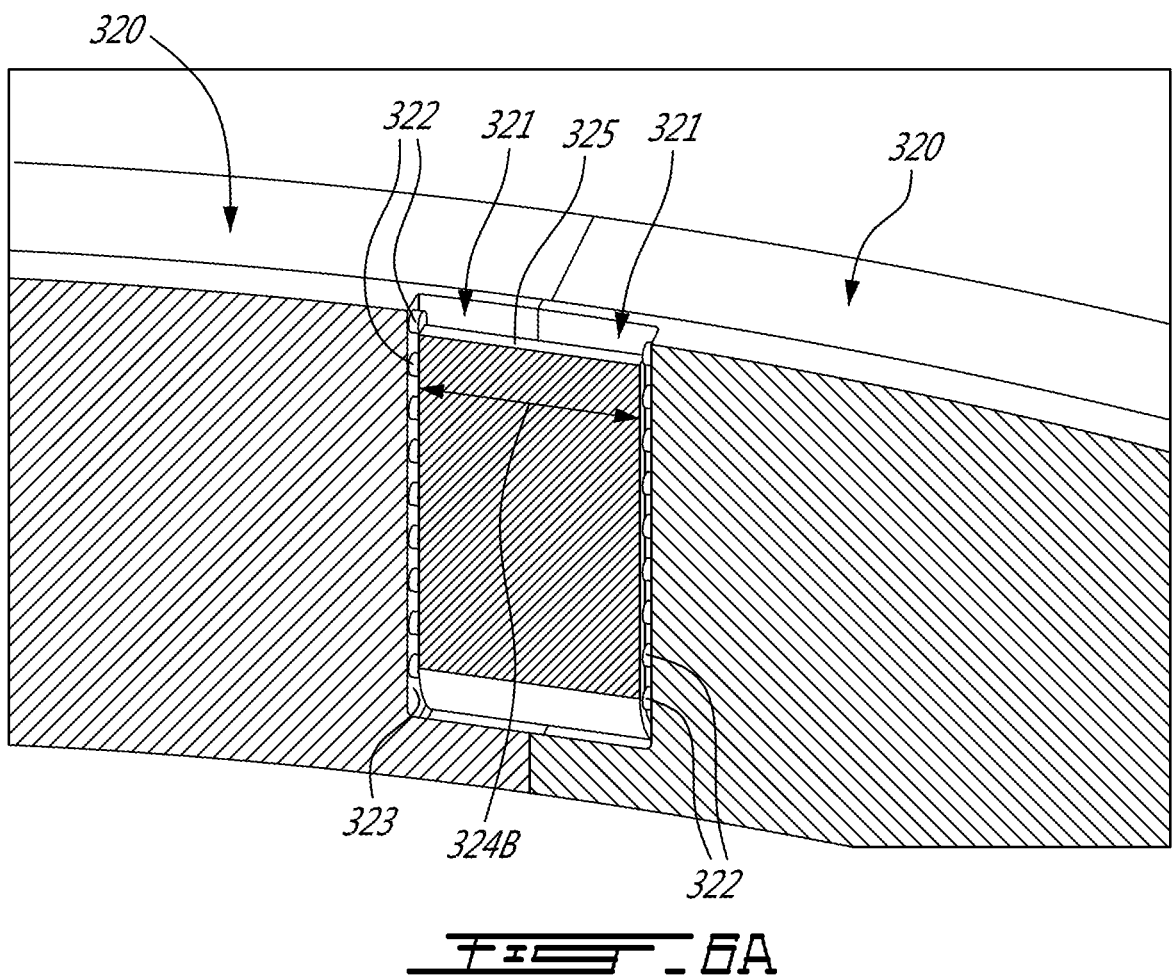
FIG. 6A is a schematic tridimensional view of shroud segments of the gas turbine engine of FIG. 1 engaged by a seal, according to another particular embodiment.

Referring to FIG. 6A, a shroud segment 320 according to another embodiment is shown, where the final depth 324B of the slot 221 is not obtained by deforming the protrusions 322 with a tool; in this case, the deforming element is the seal 325 itself. The protrusions 322 are compressed against the surface 323 of the slot 321 during the first high temperature operation of the gas turbine engine. More particularly, the thermal expansion of adjoining shroud segments 320 toward each other causes the feather seal 325 inserted in the slots 321 of the shroud segments 320 to press against and plastically deform the protrusions 322 of each shroud segment 320. The final depth 324B thus obtained corresponds to the necessary slot dimension to contain the seal 325 at high temperatures. The seal 325 is disengaged from the protrusions 322 upon cooling.

Figure 6B:
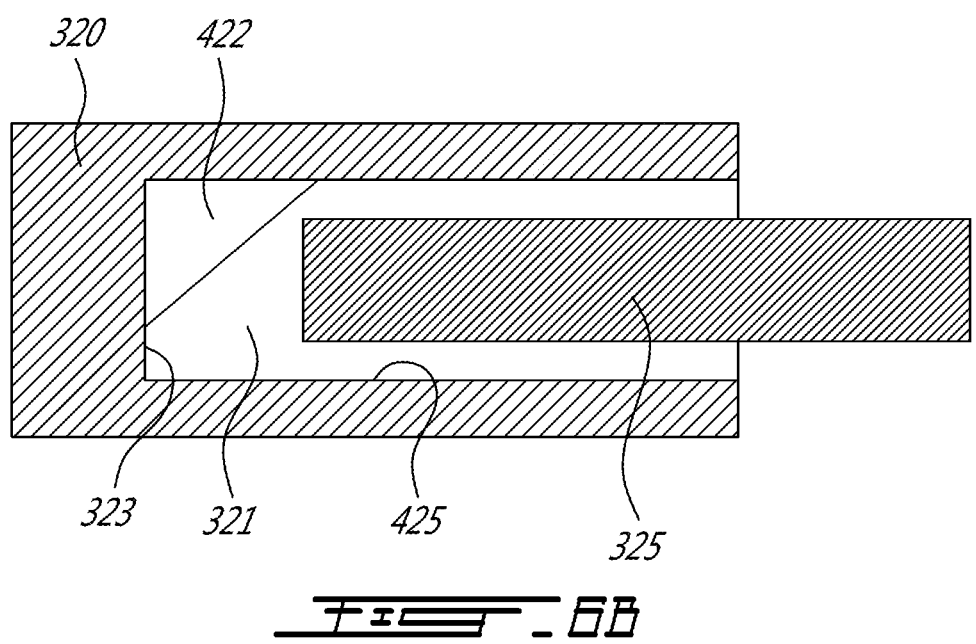
FIG. 6B is a schematic top view of an end of a shroud segment of the gas turbine engine of FIG. 1 engaged by a seal, according to another particular embodiment.

In a particular embodiment and with reference to FIG. 6B, the protrusions 422 can form a "wedge" to push the seal 325 toward a sealing surface 425 of the slot 321. More particularly, one or more protrusions 422 can be offset from a center of the bottom surface 323 away from the sealing surface 425, and/or the distal ends of the protrusions 422 can be angled to extend further away from the bottom surface 323 as a distance from the sealing surface 425 increases. During thermal expansion of the shroud segments 320, the offset protrusions 422 forces the seal 325 against the sealing surface 425 of the shroud segment 320.

Referring to FIG. 7, forming of the parts through powder metallurgy and/or molding methods (e.g. powder injection molding, additive manufacturing, casting) allows in some embodiments for the part 420 to be formed with a cavity 421 having a central axis 422 curved along at least part of its length of the cavity. The cavity 421 can include protrusions as detailed above, and the deforming tool is correspondingly curved to be able to be received within the cavity 421 and deform the protrusions. Alternate shapes for the cavity may also be used, including, but not limited to, a corkscrew shape.

In a particular embodiment, the part and method disclosed herein help to precision form a relatively small cavity in a part having tight tolerances for receiving an element within the cavity. This may allow the part and its cavity to be rapidly manufactured using powder metallurgy or other suitable techniques because the unobstructed portion of the cavity can subsequently be formed to its precise final size by deforming the protrusions in the cavity. It may thus be possible to form a feather-seal slot having a precise depth in a metal injection molded (MIM) shroud segment, since the effective feather-seal slot depth can be controlled by deforming the protrusions. In a particular embodiment, the part and method disclosed herein help to compensate for the lack of precision associated with manufacturing parts using powder metallurgy methods (including additive manufacturing) and/or molding methods.

Furthermore, by deforming the protrusions to precise dimensions, the need for additional precision machining operations may be reduced and/or eliminated. It is therefore possible to deform the protrusions in a slot/hole with an oversized element (e.g. die, cylindrical deforming tool) to provide for a controlled dimension adapted to removably receive a smaller element (e.g. seal, pin).

The above description is meant to be exemplary only, and one skilled in the art will recognize that changes may be made to the embodiments described without departing from the scope of the invention disclosed. For example, although the dimensions discussed herein are diameter and depth depending on the embodiment, it is understood that any appropriate dimension of an opening can be sized using the method discussed herein, including without limitation radius, thickness and width. Still other modifications which fall within the scope of the present invention will be apparent to those skilled in the art, in light of a review of this disclosure, and such modifications are intended to fall within the appended claims.

The invention claimed is:

1. A shroud segment assembly for a gas turbine engine, comprising:

adjacent shroud segments defining a seal cavity therebetween, each shroud segment having a body with a plurality of deformable protrusions extending from at least one internal surface of the body, the deformable protrusions having distal ends bordering an unobstructed portion of the seal cavity, the unobstructed portion defining an initial dimension of the seal cavity at least partially defined by a position of the distal ends, the deformable protrusions being plastically deformable toward the at least one internal surface to increase the initial dimension to a final dimension of the seal cavity; and a seal removably receivable within the seal cavity after deformation of the protrusions, the seal having a dimension defined along a direction corresponding to the initial and final dimensions, the dimension of the seal being larger than the initial dimension and smaller than the final dimension.

2. The shroud segment assembly as defined in claim 1, wherein the cavity is formed as a slot in a surface of each shroud segment, the at least one surface being a bottom surface of the slot, the initial dimension being an initial depth of the slot as measured from the surface of the shroud segment to the distal ends.

3. The shroud segment assembly as defined in claim 1, wherein a central axis of the cavity is curved.

4. The shroud segment assembly as defined in claim 1, wherein the cavity extends through each shroud segment and the at least one internal surface is a circumferential surface, the protrusions being formed to extend radially from the circumferential surface, the initial dimension being an initial diameter defined between the distal ends of opposing ones of the protrusions.

5. The shroud segment assembly as defined in claim 3, wherein the protrusions are regularly spaced apart around the circumferential surface of the cavity.

6. The shroud segment assembly as defined in claim 1, wherein the protrusions are spaced apart along a length of the at least one internal surface.

* * * * *